United States Patent
Kim et al.

(10) Patent No.: US 10,965,936 B2
(45) Date of Patent: Mar. 30, 2021

(54) APPARATUS, METHOD AND SYSTEM FOR DETECTING ADDITIONAL DATA FOR PREVENTING FORGERY OF VIDEO CONTENT, RENDERING APPARATUS INTEROPERATING WITH DISPLAY APPARATUS, AND RENDERING METHOD THEREOF

(71) Applicant: MARKANY INC., Seoul (KR)

(72) Inventors: So Won Kim, Seoul (KR); Hyungyu Kim, Seoul (KR); Tai Yoon Lee, Seoul (KR); Seung Yeob Chae, Seoul (KR)

(73) Assignee: MARKANY INC., Seoul (KR)

( * ) Notice: Subject to any disclaimer, the term of this patent is extended or adjusted under 35 U.S.C. 154(b) by 78 days.

(21) Appl. No.: 16/255,630

(22) Filed: Jan. 23, 2019

(65) Prior Publication Data

US 2020/0221073 A1 Jul. 9, 2020

(30) Foreign Application Priority Data

Jan. 4, 2019 (KR) .......................... 10-2019-0001116

(51) Int. Cl.
*H04N 17/00* (2006.01)
*G06T 1/00* (2006.01)
*H04N 7/00* (2011.01)
*H04N 21/422* (2011.01)

(52) U.S. Cl.
CPC ........... *H04N 17/004* (2013.01); *G06T 1/005* (2013.01); *H04N 7/007* (2013.01); *H04N 21/42204* (2013.01); *G06T 2201/0064* (2013.01); *G06T 2201/0065* (2013.01)

(58) Field of Classification Search
CPC .... H04N 17/004; H04N 5/4403; H04N 7/007; G06T 1/005; G06T 2201/0065; G06T 2201/0064
See application file for complete search history.

(56) References Cited

U.S. PATENT DOCUMENTS

| | | | |
|---|---|---|---|
| 6,216,228 B1* | 4/2001 | Chapman | G06T 1/0021 348/E7.061 |
| 6,768,980 B1* | 7/2004 | Meyer | G06T 1/0021 382/248 |
| 2002/0186887 A1* | 12/2002 | Rhoads | G06K 9/00442 382/232 |
| 2004/0071311 A1* | 4/2004 | Choi | G06T 1/0071 382/100 |
| 2004/0131184 A1* | 7/2004 | Wu | H04N 21/8358 380/202 |
| 2004/0208339 A1* | 10/2004 | Abe | G06T 1/0028 382/100 |

(Continued)

*Primary Examiner* — Aaron W Carter
(74) *Attorney, Agent, or Firm* — Invenstone Patent, LLC (57) ABSTRACT

One aspect of the present invention discloses an apparatus for detecting additional data for preventing forgery of video data and displaying the video content. The apparatus includes a content input unit configured to receive the video content (the video content including the additional data), a display unit configured to display the video content, an additional data detector configured to detect the additional data from the video content (the additional data including a watermark), and a display controller configured to control a display screen of the video content according to an additional data detection result.

17 Claims, 6 Drawing Sheets

(56) References Cited

U.S. PATENT DOCUMENTS

| | | | |
|---|---|---|---|
| 2004/0258243 A1* | 12/2004 | Shin | H04N 5/76 380/210 |
| 2005/0053239 A1* | 3/2005 | Nomizu | H04N 21/8358 380/220 |
| 2005/0129268 A1* | 6/2005 | Maeno | G06T 1/0042 382/100 |
| 2006/0072784 A1* | 4/2006 | Iwamura | H04N 1/32165 382/100 |
| 2006/0120558 A1* | 6/2006 | Shi | H04N 1/3217 382/100 |
| 2006/0120560 A1* | 6/2006 | Davis | H04L 67/2895 382/100 |
| 2007/0250194 A1* | 10/2007 | Rhoads | G06Q 30/02 700/94 |
| 2009/0021793 A1* | 1/2009 | Lu | H04N 1/387 358/3.28 |
| 2009/0125310 A1* | 5/2009 | Lee | H04N 21/23892 704/273 |
| 2009/0175490 A1* | 7/2009 | Price | G06T 1/0021 382/100 |
| 2010/0266157 A1* | 10/2010 | Shin | H04N 19/467 382/100 |
| 2013/0238901 A1* | 9/2013 | Wise | H04L 63/0428 713/168 |
| 2014/0133694 A1* | 5/2014 | Mishra | H04N 1/00129 382/100 |
| 2015/0242983 A1* | 8/2015 | Digiovanni | G06T 1/005 382/100 |
| 2015/0281774 A1* | 10/2015 | Atkin | H04N 21/64322 725/14 |
| 2018/0211354 A1* | 7/2018 | Kim | G06T 1/0028 |
| 2018/0232843 A1* | 8/2018 | Kim | H04N 19/177 |
| 2019/0279330 A1* | 9/2019 | Kim | G06T 1/0071 |
| 2019/0294761 A1* | 9/2019 | Kim | G06F 21/16 |
| 2020/0221073 A1* | 7/2020 | Kim | G06F 21/10 |
| 2020/0410186 A1* | 12/2020 | Holub | G06K 9/6277 |

* cited by examiner

APPARATUS, METHOD AND SYSTEM FOR DETECTING ADDITIONAL DATA FOR PREVENTING FORGERY OF VIDEO CONTENT, RENDERING APPARATUS INTEROPERATING WITH DISPLAY APPARATUS, AND RENDERING METHOD THEREOF

CROSS-REFERENCE TO RELATED APPLICATIONS

This application claims the benefit of priority of Korean Patent Application No. 10-2019-0001116 filed on Jan. 4, 2019, all of which are incorporated by reference in their entirety herein.

BACKGROUND OF THE INVENTION

Field of the Invention

The present invention relates to a method for inserting additional data into digital content and detecting the additional data and, more specifically, to a method for efficiently detecting additional data inserted for preventing forgery of content.

Related Art

As digital content is increasingly provided through the Internet due to recent development of communication technology, a risk of illegal access and forgery of content is encountered. Although content security through digital right management (DRM) is mainly used in conventional content provision services, authentication through code security such as code access security (CAS) is technically inadequate to cope with illegal access and forgery with respect to authenticated users.

Furthermore, Internet connection through which content is transmitted from content providers to clients is relatively vulnerable to security and thus has a high risk of illegal leak, forgery and illegal access.

Watermarking, which is a technique for preventing such illegal access and forgery, identifies a person who accesses or forges content by inserting specific data into the content and detecting the data after the content is accessed.

However, conventional watermarking techniques simply insert data into content and identify a person who accesses the content according to whether the data is detected after the content is accessed, and thus it is difficult to accurately determine forgery and illegal access. Furthermore, in the case of content displayed to public, it is difficult to prevent illegal access of the content beforehand because a person who accesses the content is identified after the content is displayed.

SUMMARY OF THE INVENTION

An object of one aspect of the present invention is to provide a display apparatus, a display method and a system capable of preventing display of video content according to forgery and illegal access by detecting additional data included in the video content and performing filtering with respect to display.

According to one aspect of the present invention to accomplish the object of the present invention, an apparatus for detecting additional data for preventing forgery of video content and displaying the video content may include: a content input unit for receiving the video content (the video content including the additional data); a display unit for displaying the video content; an additional data detector for detecting the additional data from the video content (the additional data including a watermark); and a display controller for controlling a display screen of the video content according to an additional data detection result.

The display controller may (i) normally display the video content in response to normal detection of the additional data from the video content and (ii) restrict normal output of the display screen displaying the video content in response to abnormal detection of the additional data from the video content.

The display controller may turn off the display screen in response to abnormal detection of the additional data.

The display controller may process the display screen into a monochrome screen in response to abnormal detection of the additional data.

The display controller may use a first display control manner in response to abnormal detection of a first element of a plurality of elements of the additional data and use a second display control manner in response to abnormal detection of a second element of the plurality of elements of the additional data.

A matching relationship between a plurality of elements of abnormally detected additional data and display control manners corresponding thereto may be stored in the form of a lookup table.

The display controller may control rendering of the video content on the basis of control information from a rendering apparatus interoperating with the apparatus, and the control information may be generated on the basis of whether the additional data is normally detected in the rendering apparatus.

The additional data detector may determine whether the additional data is normally detected on the basis of at least one of a period in which content can be played, content right holder information, purchaser information and distribution attribute information related to the additional data.

The video content may be content input through off-line.

According to another aspect of the present invention to accomplish the object of the present invention, a method for detecting additional data for preventing forgery of video content and displaying the video content may include: a content input unit receiving the video content (the video content including the additional data); a display unit displaying the video content; an additional data detector detecting the additional data from the video content (the additional data including a watermark); and a display controller controlling a display screen of the video content according to an additional data detection result.

According to another aspect of the present invention to accomplish the object of the present invention, a system for detecting additional data for preventing forgery of video content and displaying the video content may include: a content rendering apparatus for receiving video content including additional data through a wired or wireless network, detecting the additional data included in the video content and determining whether to play the video content through a display apparatus according to a first detection result of the additional data (the additional data including a watermark); and the display apparatus connected to the content rendering apparatus in a wired or wireless manner to receive video content from the content rendering apparatus and display the video content and configured to detect the additional data from the video content and control a display screen of the video content according to a second detection result of the additional data.

The content rendering apparatus may provide the first detection result to the display apparatus and the display apparatus may determine whether the video content is played according to the first detection result.

The display apparatus may turn off the display screen of the video content according to the second detection result even when the first detection result indicates rendering of the video content.

The content rendering apparatus may generate the first detection result using a first additional data detection manner and the display apparatus may generate the second detection result using a second additional data detection manner.

The first additional data detection manner may be a manner of extracting a watermark value using a least significant bit (LSB) of a quantized wavelet coefficient of a watermark-inserted region among wavelet coefficients of a first region of the video content, and the second additional data detection manner may be a manner of extracting a watermark value using an LSB of a quantized DCT coefficient of the watermark-inserted region among DCT coefficients of the first region of the video content.

According to another aspect of the present invention to accomplish the object of the present invention, a rendering apparatus interoperating with a display apparatus may include: a communication unit communicating with a wired or wireless network; a content input unit for receiving video content through the wired or wireless network using the communication unit, the video content including additional data; an additional data detector for detecting the additional data included in the video content, the additional data including a watermark; and a content rendering controller for determining whether the video content is played in the display apparatus according to a first detection result of the additional data and instructing control information with respect to rendering of the video content to be provided to the display apparatus.

The rendering apparatus may further include a user interface through which at least one of a first filtering option for determining whether the video content is played through the display apparatus on the basis of the first detection result of the rendering apparatus and a second filtering option for determining on or off of a display screen of the video content in the display apparatus according to a second detection result of the additional data in the display apparatus is selectable.

The content rendering controller may generate control information for causing the video content to be unable to be played through the display apparatus in response to abnormal detection of the additional data as the first detection result, and generate control information indicating rendering of the video content in the display apparatus in response to normal detection of the additional data as the first detection result.

According to another aspect of the present invention to accomplish the object of the present invention, a video content rendering method in a rendering apparatus interoperating with a display apparatus may include: receiving video content through a wired or wireless network, the video content including additional data; detecting the additional data included in the video content, the additional data including a watermark; and determining whether the video content is played in the display apparatus according to a first detection result of the additional data and instructing control information with respect to rendering of the video content to be provided to the display apparatus.

DESCRIPTION OF EXEMPLARY EMBODIMENTS

The present invention can be modified in various forms, and specific embodiments thereof will be described and shown in the drawings. However, the embodiments are not intended for limiting the invention to specific embodiments and the scope of the present invention should be understood to include modifications, equivalents and substitutions that can realize the technical ideas.

The terms "first" and "second" may be used to describe various components, but such components are not limited by these terms. The terms are used to discriminate one component from another component. Accordingly, a first component mentioned in the following description may be a second component within the technical spirit of the present invention. For example, a first element may be called a second element and the second element may be called the first element without departing from the scope of the present invention. The term "and/or" includes a combination of a plurality of related stated items or any of a plurality of related stated items.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The terms used in the application are merely used to describe specific embodiments and do not limit the present invention. An element described in the singular form is intended to include a plurality of elements unless the context clearly indicates otherwise. In the specification of the present invention, it will be understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Unless particularly defined otherwise, all terms including technological or scientific terms used herein should be construed as a meaning that is generally understood by those having ordinary skill in the art to which the invention pertains. In addition, general terms used in this invention should be construed based on the definition of dictionary, or the context, and should not be construed too broadly or too narrowly.

Hereinafter, preferred embodiments of the present invention will be described in detail with reference to the accompanying drawings. The same elements are designated with the same numeral references and their redundant description will be omitted.

Figure 1:
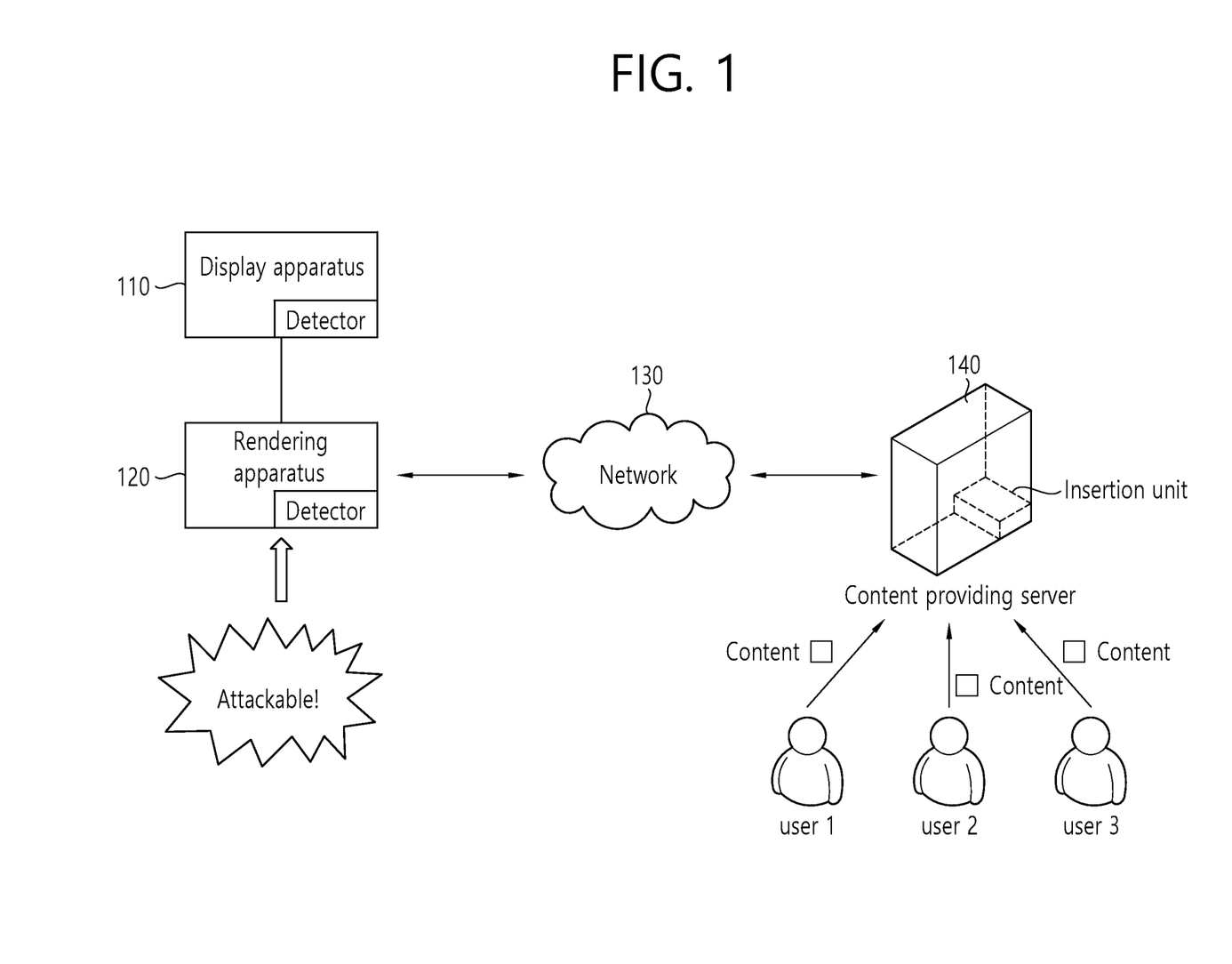
FIG. 1 is a block diagram showing a system including a display apparatus according to an embodiment of the present invention.

FIG. 1 is a block diagram showing a system including a display apparatus according to an embodiment of the present invention. As shown in FIG. 1, the system may include a display apparatus 110, a rendering apparatus 120, a network 130 and a content providing server 140.

The content providing server 140 receives content from users. The received content is various types of multimedia content including video content and audio content. An insertion unit of the content providing server 140 inserts additional data for preventing forgery and external access of digital content into received content. The additional data may include a key value, an ID, a watermark, a fingerprint, and the like. Here, the watermark may include a Forensic watermark, an index watermark and the like.

The insertion unit also inserts rights attribute information necessary to generate a watermark as additional data. The rights attribute information may include one or more of information on a license period in which corresponding content can be played and displayed, distribution attribute/distribution channel information, right holder information, a purchaser information, user information and provider information. Additional data information generated in the aforementioned manner is generated as a hash code and inserted into content. The content providing server 140 provides the content having the additional data included therein to the rendering apparatus 120 through the network 130 using a specific website or other radio communication channels.

The network 130 may include communication networks and/or broadcast networks. The network 130 includes a wired or wireless network. The rendering apparatus 120 may be realized as a set-top box. The rendering apparatus may be called a player. The rendering apparatus 120 can receive content from the server through the network. The rendering apparatus 120 can receive user input from a user input device and request content from the server 140 on the basis of the received information. The rendering apparatus 120 includes a detector. The detector is a module that detects the additional data inserted by the content providing server 140. The detector extracts the additional data and determines whether the extracted additional data is normal additional data. The corresponding content is played when the extracted additional data is normal additional data and rendering of the content is stopped if not. The rendering apparatus 120 is connected to the display apparatus 110 in a wired manner and/or a wireless manner such that the display apparatus 110 renders the content. Otherwise, the rendering apparatus 120 instructs the display apparatus 110 not to render the content.

The display apparatus 110 is a device interoperating with the rendering apparatus 120. Alternatively, the display apparatus 110 may be a device that displays input content without interoperating with the rendering apparatus 120. The display apparatus 110 may include a monitor, a TV, a touch panel, a transparent display panel and the like. When the display apparatus 110 is connected to the rendering apparatus 120, the display apparatus 110 receives a rendering command from the rendering apparatus 120 and renders content received from the rendering apparatus 120. When the display apparatus 110 is not connected to the rendering apparatus 120, the display apparatus 110 can receive content off-line. For example, the display apparatus 110 can receive content through storage media such as a CD, a DVD and a USB. Then, the display apparatus 110 can render the received content according to user input from a user input device.

The display apparatus 110 includes a detector that detects additional data. The detector of the display apparatus 110 detects additional data and determines whether content will be displayed. Irrespective of whether the display apparatus 110 is connected to the rendering apparatus 120, the display apparatus 110 can detect additional data when content is played and determine that the content is forged or illegally accessed content when the detected additional data is not consistent with an inserted data value to block display of the content. Blocking display may include screen off, processing display into monochrome display, processing a partial region into a black box, stripe processing and screen deterioration. When the display apparatus 110 is connected to the rendering apparatus 120, additional data can be detected by the detector of the rendering apparatus 120 and the detector of the display apparatus 110 up to twice and it can be determined whether the additional data is normal. Accordingly, it is possible to improve the efficiency of defending against attacks of illegal users by double-blocking the attacks of the illegal users. Particularly, the rendering apparatus 120 exposed to online is highly likely to be exposed to attacks from illegal users, such as attacks on the server 140 and attacks on the network 130, whereas the display apparatus 110 operates without being connected to a network and thus processing of additional data through the detector of the display apparatus 110 may have considerably important meaning. That is, even if an illegal user attacks the rendering apparatus 120 through the network 130 and the insertion unit of the rendering apparatus 120 does not detect the attack, the detector of the display apparatus 110 secondarily detects additional data of content and determines whether the additional data is normal before the content is displayed, and thus it is possible to detect an attack on the rendering apparatus 120 and block display to prevent rendering of illegal advertisements or inappropriate content.

Figure 2:
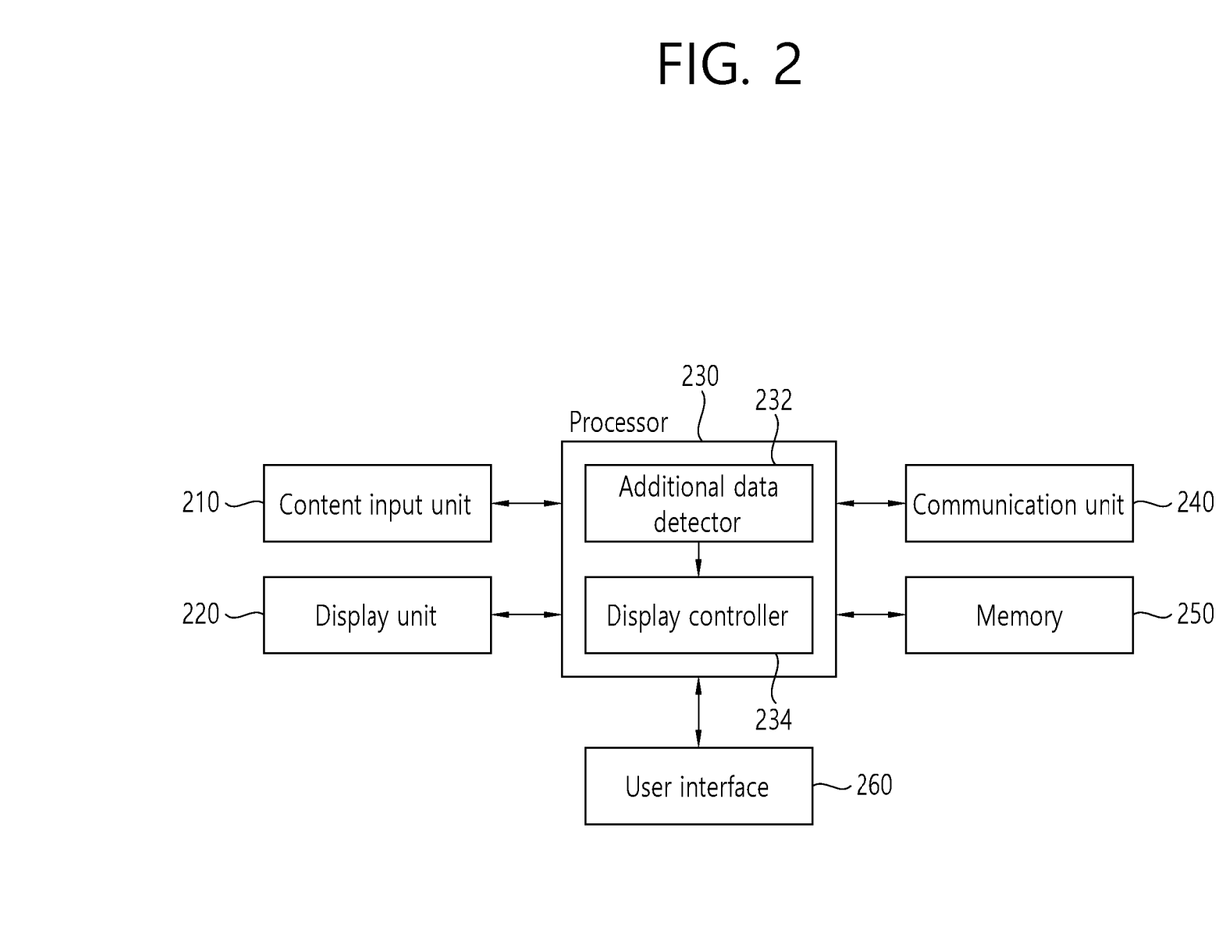
FIG. 2 is a block diagram showing a configuration of the display apparatus according to an embodiment of the present invention in detail.

FIG. 2 is a block diagram showing a configuration of the display apparatus according to an embodiment in more detail. As shown in FIG. 2, the display apparatus may include a content input unit 210, a display unit 220, a processor 230, a communication unit 240, a memory 250 and a user interface 260.

Referring to FIG. 2, the content input unit 210 is a component that receives content. The content input unit 210 can receive content through the communication unit 240 that performs communication with wired or wireless networks Alternatively, the content input unit 210 may be realized as a CD-ROM, DVD-ROM or USB port to receive content through a storage medium such as a CD, a DVD or a USB without a network.

The display unit 220 is a component that constitutes display screens. The display unit 220 can be realized as a monitor, a TV and other various panels (LCD, PDP, LED and OLED).

The processor 230 is a component that controls rendering and display of content. The processor 230 may include an additional data detector 232 and a display controller 234. The additional data detector 232 is a module that detects additional data included in content. The display controller 234 is a module that controls display of content through the display unit 220 according to an additional data detection result of the additional data detector 232. These two modules will be described in more detail with reference to FIG. 3.

Figure 3:
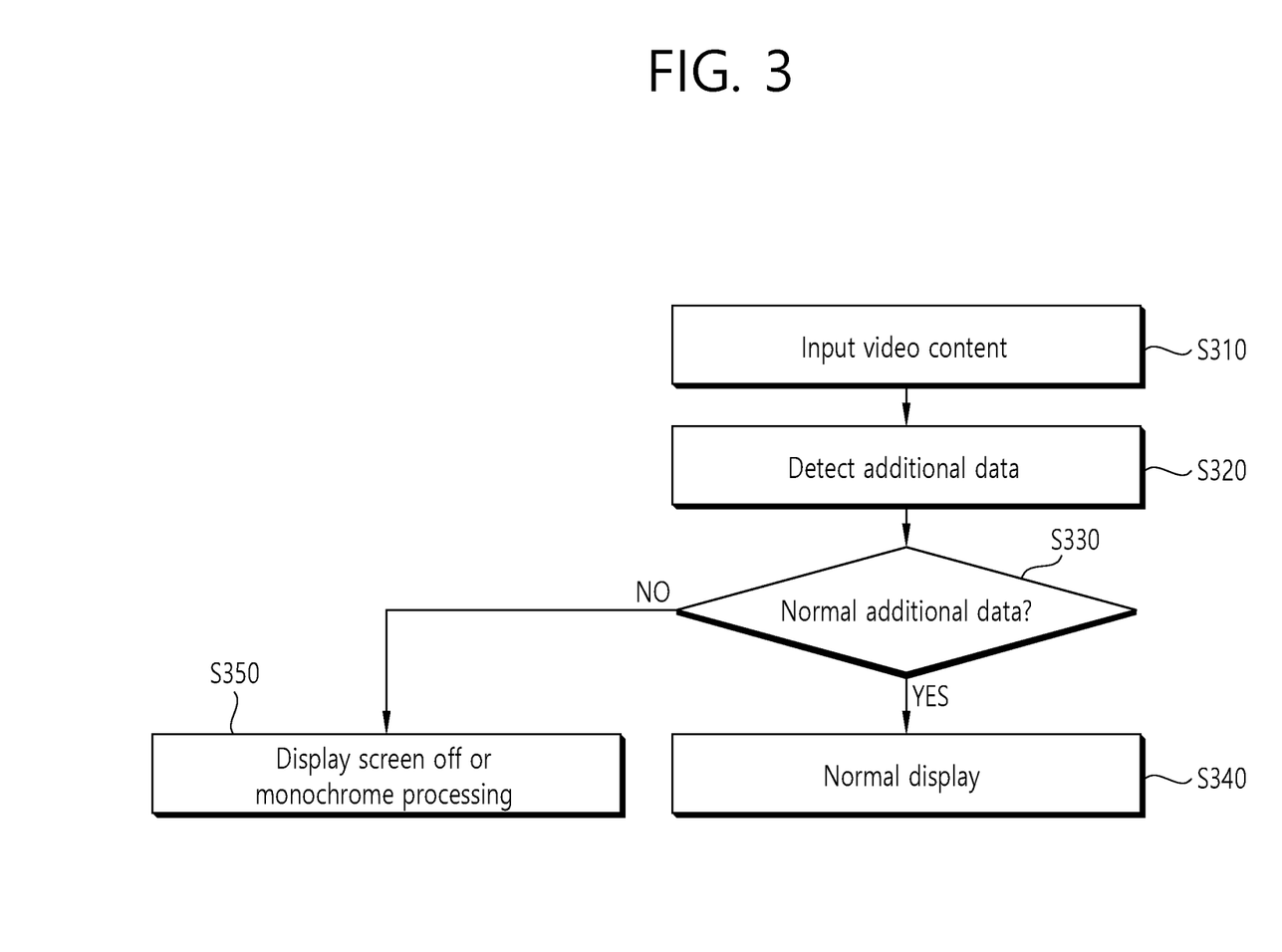
FIG. 3 is a flowchart showing a method for controlling display in response to detection of additional data in a display apparatus according to an embodiment of the present invention.

FIG. 3 is a flowchart showing a method for controlling display in response to additional data detection in the display apparatus according to an embodiment of the present invention.

Referring to FIG. 3, when video content is input through the content input unit 210 (S310), the additional data detector 232 detects additional data from the input content (S320). The additional data detector 232 can extract a watermark value by obtaining a hash value associated with the content. For example, the additional data detector 232 can extract a watermark value using a least significant bit (LSB) of a quantized wavelet coefficient or a DCT coefficient of a watermark-inserted region among wavelet coefficients and/or a DCT coefficients of a specific region of the content that is a detection target.

The additional data detector 232 determines whether the extracted watermark is a normal watermark (S330). The additional data detector 232 can determine whether the additional data is normal on the basis of whether the watermark value is identical to the hash value. In addition, the additional data detector 232 can determine whether the additional data is normal on the basis of at least one of license period information, distribution attribute/distribution channel information, right holder information, purchaser information, user information and provider information. For example, it is possible to compare information on the current time that is known to the apparatus with license period information included in the additional data and determine that the additional data is normal when the current time is included in the license period. Further, it is possible to determine whether the additional data is normal additional data on the basis of whether an ID that is not associated with purchase is present on the distribution channel. Moreover, it is possible to detect the watermark value on the basis of a key value associated with the content and then determine whether the detected water mark is normal.

The display controller 234 normally displays the input content when it is determined that the additional data is normal (S340).

However, when it is determined that the additional data is not normal, the display controller 234 can turn off the display screen with respect to the input content (S350). Here, the display controller 234 does not necessarily turn off the display screen according to the detection result representing that the additional data is not normal. The display controller 234 may process a predetermined region of the display screen into a black box, process the screen into a monochrome screen or control only pixels in columns or rows in a predetermined order to be displayed in a stripe form. Alternatively, the display controller 234 may control a screen with respect to a part of or entire region to be displayed in a deteriorated manner. Settings associated with display screen processing with respect to abnormal additional data may be arbitrarily set and changed through user setting.

According to another embodiment of the present invention, when a result representing that one of a plurality of elements (a license period, a distribution channel, a distribution attribute, purchaser information and right holder information) of additional data is abnormal is derived, a control method for preventing display corresponding to the abnormal element can be performed. For example, a display screen can be turned off when an abnormal result related to a first element (license period) is derived and the display screen can be processed into a monochrome screen when an abnormal result related to a second element (distribution channel) is derived. A matching relationship between a specific element of additional data and a control method associated with blocking of normal display may be prestored in the memory 250 in the form of a lookup table. The display controller 234 restricts output of a display that matches an abnormal element of additional data with reference to the matching relationship.

Referring back to FIG. 2, the communication unit 240 is a component for communication with wired or wireless networks. The communication unit 240 may be realized as an antenna.

The memory 250 is a storage device that stores commands associated with the operation of the processor 230. The memory 250 may store at least a part of input content and the processor 230 may display content on the basis of a selection command for one of the content stored in the memory 250. The selection command can be input through the user interface 260.

The user interface 260 includes devices through which user input is received, such as a keyboard, a mouse and a touchscreen.

Figure 4:
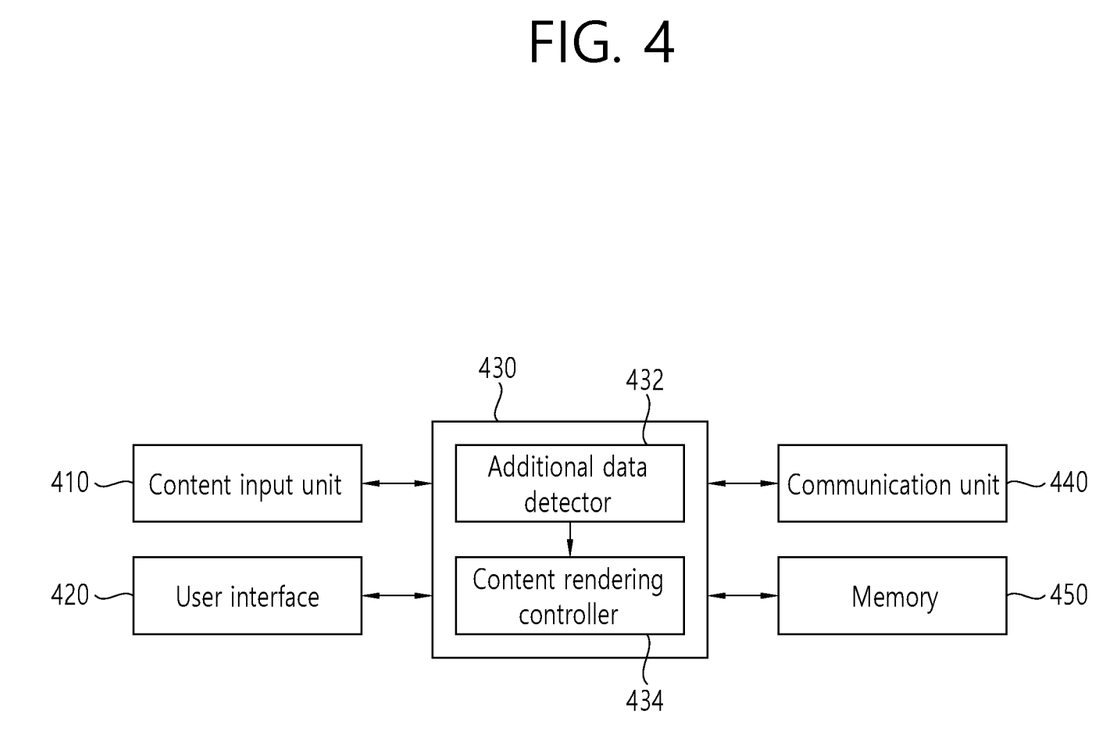
FIG. 4 is a block diagram showing a configuration of a rendering apparatus interoperating with the display apparatus according to an embodiment of the present invention in detail.

FIG. 4 is a block diagram showing a configuration of the rendering apparatus interoperating with the display apparatus according to an embodiment of the present invention in detail. As shown in FIG. 4, the rendering apparatus may include a content input unit 410, a user interface 420, a processor 430, a communication unit 440 and a memory 450.

Referring to FIG. 4, the content input unit 410 is a component through which content is input. The content input unit 410 may receive content through the communication unit 440 that performs communication with wired or wireless networks.

The user interface 420 includes devices through which user input is received, such as a keyboard, a mouse and a touchscreen. A user can check settings while viewing a setting screen displayed through the display unit 220 of the display apparatus (refer to FIG. 2) connected to the rendering apparatus. Here, user input can be input using the user interface 420.

The processor 430 is a component for controlling rendering of content. The processor 430 may include an additional data detector 432 and a content rendering controller 434. The additional data detector 432 is a module that detects additional data included in content. The content rendering controller 434 is a module that controls rendering of content in a display apparatus according to an additional data detection result in the additional data detector 432. These two modules will be described in detail with reference to FIG. 5.

Figure 5:
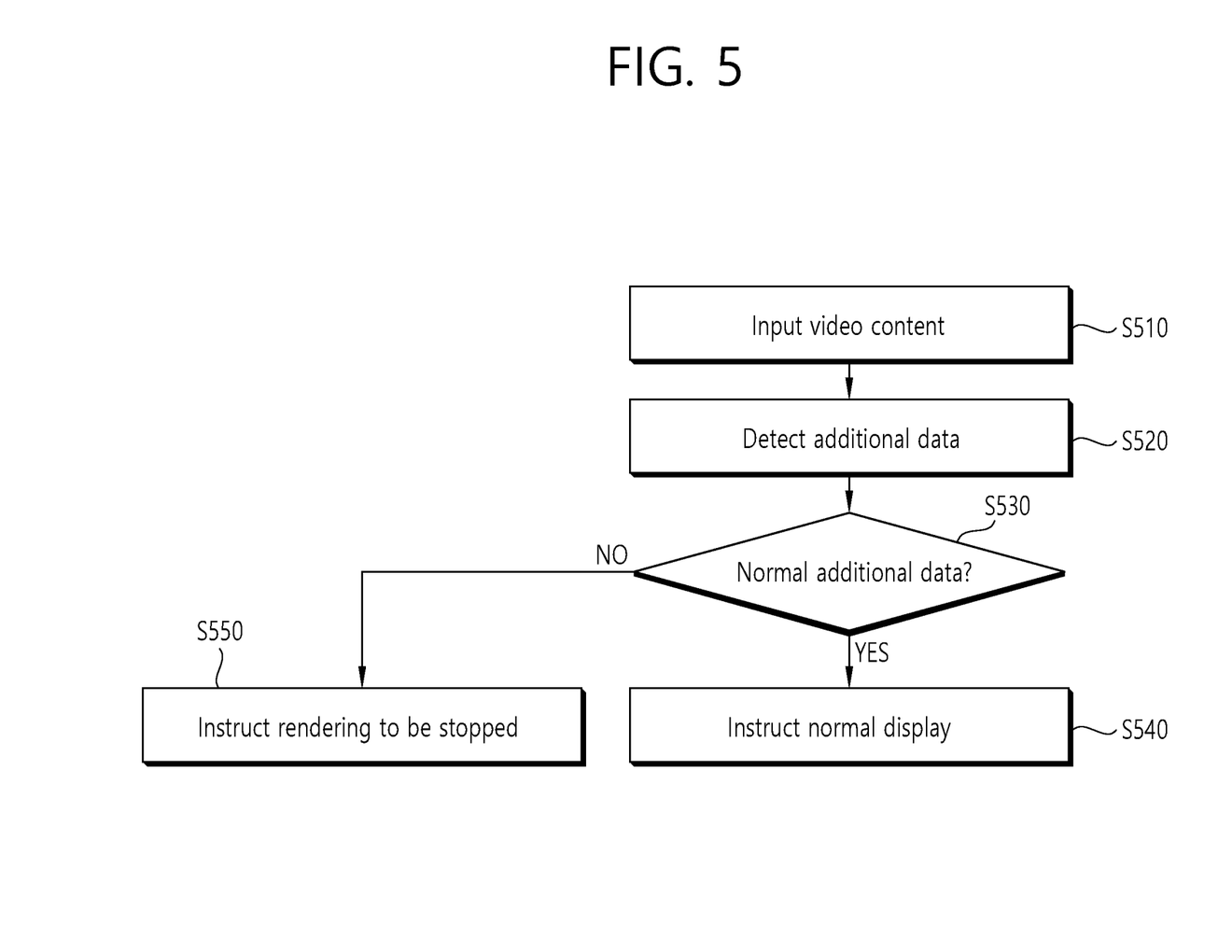
FIG. 5 is a flowchart showing a method for controlling rendering of content in response to detection of additional data in the rendering apparatus according to an embodiment of the present invention.

FIG. 5 is a flowchart showing a manner for controlling rendering of content in response to additional data detection in the rendering apparatus according to an embodiment of the present invention.

Referring to FIG. 5, when video content is input through the control input unit 410 (S510), the additional data detector 432 detects additional data from the input content (S520). The additional data detector 432 can extract a watermark value by obtaining a hash value associated with the content.

The additional data detector 432 determines whether the extracted watermark is a normal watermark (S530). Here, the additional data detector 432 of the rendering apparatus can detect additional data using a manner similar to that used by the additional data detector of the display apparatus. Fundamentally, the additional data detector 432 can determine whether the additional data is normal on the basis of whether the watermark value is the same as the hash value. Further, the additional data detector 432 can determine whether the additional data is normal on the basis of at least one of license period information, distribution attribute/distribution channel information, right holder information, purchaser information, user information and provider information.

According to another embodiment of the present invention, the additional data detector 432 may detect the additional data through a method different from that used by the additional data detector 232. For example, since the additional data detector 432 operates in connection with a network, the apparatus can be configured such that a first detection result is output through a first additional data detection manner (requesting handshaking with the outside) for detecting additional data in association with the server 140 (refer to FIG. 1) or the network and the additional data detector 232 detects a second detection result through a second additional data detection manner based on off-line. Additionally, the additional data detector 432 may be configured to detect a watermark using a DCT coefficient of an arbitrary macro block region of a specific frame of video content, whereas the additional data detector 232 may be configured to detect a watermark using a wavelet coefficient of the arbitrary macro block region.

Furthermore, the additional data detector 432 and the additional data detector 232 may use the same detection manner for the first element of additional data, such as license period information, and use different detection manners for the second element of the additional data, such as distribution channel information. Such additional data detection manners can be set through the display unit of the display apparatus and the user interfaces of the rendering apparatus and/or the display apparatus.

When it is determined that the additional data is normal, the content rendering controller 434 provides instruction information related to rendering to the display apparatus such that the input content is normally rendered through the display apparatus (S540).

On the other hand, when it is determined that the additional data is not normal, the content rendering controller 434 can stop rendering of the input content in the display apparatus (S550). That is, the content rendering controller 434 can provide control information for instructing rendering to be stopped to the display apparatus.

Referring back to FIG. 4, the communication unit 440 is a component for communication with wired or wireless networks. The communication unit 440 may be realized as an antenna.

The memory 450 is a storage device that stores commands associated with the operation of the processor 430. The memory 450 may store at least a part of input content.

Figure 6:
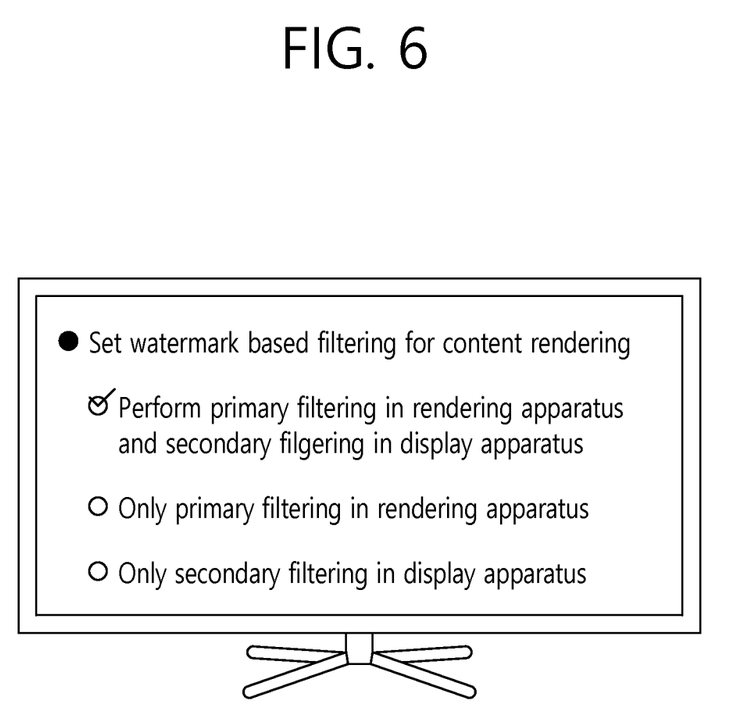
FIG. 6 is a diagram showing a user interface through which user settings are input with respect to filtering for content rendering in the rendering apparatus according to an embodiment of the present invention.

FIG. 6 is a diagram showing a user interface through which user settings with respect to filtering for content rendering are input in the rendering apparatus according to an embodiment of the present invention.

Referring to FIG. 6, settings for filtering content on the basis of a watermark in a system including a rendering apparatus and a display apparatus include (i) a manner of double-detecting additional data and filtering the additional data and (ii) a manner of detecting and filtering additional data once.

In the case of (i), the system operates according to filtering settings in which content is instructed to be played when the rendering apparatus primarily detects normal additional data and normal display of the content is performed when the display apparatus secondarily detects normal additional data.

In the case of (ii), filtering settings (ii)-(a) include settings in which only the rendering apparatus detects additional data and filtering with respect to content rendering is performed and filtering settings (ii)-(b) include settings in which only the display apparatus detects additional data and filtering with respect to content display is performed.

With respect to such a setting screen, the rendering apparatus and/or the display apparatus can provide a user interface for selecting one of the aforementioned three settings (i), (ii)-(a) and (ii)-(b). When the rendering apparatus selects one of the aforementioned three settings, the apparatus provides information related to the selection to the display apparatus such that the display apparatus performs or does not perform filtering according to a set filtering manner. For example, additional data detection in the display apparatus and display control according to a detection result may be required in the case of the filtering settings (i) and (ii)-(b) but may not be required in the filtering settings (ii)-(a).

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

According to the apparatus for detecting additional data for preventing forgery of video content and displaying the video content according to the present invention, illegal access, forgery through hacking and distribution of unauthorized content at relatively vulnerable content transmission side can be prevented or blocked.

Furthermore, it is possible to determine illegal access with respect to a specific user by using a conventional watermarking technique and block illegal advertisements of video content providers such as Youtube and Twitch and illegal Internet site advertisements (banners).

What is claimed is:

1. An apparatus for detecting additional data for preventing forgery of video content and displaying the video content, comprising:
   a display unit configured to display the video content, wherein the video content including the additional data;
   a processor configured to receive the video content, control a display screen of the video content according to an additional data detection result,
   wherein the additional data includes a watermark,
   wherein the processor extracts a watermark value using a least significant bit (LSB) of a quantized discrete cosine transform (DCT) coefficient of a watermark-inserted region among DCT coefficients of a first region of the video content,
   wherein the processor determines whether to play the video content by a control signal from a second apparatus, wherein the control signal is generated by extracting a watermark value using a least significant bit (LSB) of a quantized wavelet coefficient of the watermark-inserted region among wavelet coefficients of the first region of the video content.

2. The apparatus of claim 1, wherein the processor (i) normally displays the video content in response to normal detection of the additional data from the video content and (ii) restricts normal output of the display screen displaying the video content in response to abnormal detection of the additional data from the video content.

3. The apparatus of claim 2, wherein the processor turns off the display screen in response to abnormal detection of the additional data.

4. The apparatus of claim 2, wherein the processor processes the display screen into a monochrome screen in response to abnormal detection of the additional data.

5. The apparatus of claim 2, wherein the processor uses a first display control manner in response to abnormal detection of a first element of a plurality of elements of the additional data and uses a second display control manner in response to abnormal detection of a second element of the plurality of elements of the additional data.

6. The apparatus of claim 5, wherein a matching relationship between a plurality of elements of abnormally detected additional data and display control manners corresponding thereto is stored in the form of a lookup table.

7. The apparatus of claim 1, wherein the processor controls rendering of the video content on the basis of control information from a second apparatus interoperating with the apparatus,
wherein the control information is generated on the basis of whether the additional data is normally detected in the second apparatus.

8. The apparatus of claim 1, wherein the processor determines whether the additional data is normally detected on the basis of at least one of a period in which the video content can be played, content right holder information, purchaser information and distribution attribute information.

9. The apparatus of claim 1, wherein the video content is content input through off-line.

10. A method for detecting additional data for preventing forgery of video content and displaying the video content, comprising:
receiving the video content, the video content including the additional data;
displaying the video content;
detecting the additional data from the video content, the additional data including a watermark; and
controlling a display screen of the video content according to an additional data detection result,
wherein the detecting the additional data comprises extracting a watermark value using a least significant bit (LSB) of a quantized discrete cosine transform (DCT) coefficient of a watermark-inserted region among DCT coefficients of a first region of the video content,
wherein controlling the display screen comprises determining whether to play the video content by a control signal from a second apparatus,
wherein the control signal is extracting a watermark value using a least significant bit (LSB) of a quantized wavelet coefficient of the watermark-inserted region among wavelet coefficients of the first region of the video content.

11. A system for detecting additional data for preventing forgery of video content and displaying the video content, comprising:
a first apparatus for receiving video content including additional data through a wired or wireless network, detecting the additional data included in the video content and determining whether to play the video content through a second apparatus according to a first detection result of the additional data, the additional data including a watermark; and
the second apparatus connected to the first apparatus in a wired or wireless manner to receive video content from the first apparatus and display the video content and configured to detect the additional data from the video content and control a display screen of the video content according to a second detection result of the additional data,
wherein the first apparatus generates the first detection result using a first additional data detection and the second apparatus generates the second detection result using a second additional data detection,
wherein the first additional data detection is extracting a watermark value using a least significant bit (LSB) of a quantized wavelet coefficient of a watermark-inserted region among wavelet coefficients of a first region of the video content,
wherein the second additional data detection is extracting a watermark value using an LSB of a quantized DCT coefficient of the watermark-inserted region among DCT coefficients of the first region of the video content.

12. The system of claim 11, wherein the first apparatus provides the first detection result to the second apparatus and the second apparatus determines whether the video content is played according to the first detection result.

13. The system of claim 11, wherein the second apparatus turns off the display screen of the video content according to the second detection result even when the first detection result indicates rendering of the video content.

14. A first apparatus interoperating with a second apparatus, comprising:
a processor configured to communicate with a wired or wireless network, and
receive video content through the wired or wireless network, wherein the video content includes additional data; and
a memory configured to store a command associated with an operation of the processor,
wherein the processer detects the additional data included in the video content,
wherein the additional data includes a watermark,
wherein the processor determines whether the video content is played in the second apparatus according to a first detection result of the additional data and instructing control information with respect to rendering of the video content to be provided to the second apparatus,
wherein the processor extracts a watermark value using a least significant bit (LSB) of a quantized wavelet coefficient of a watermark-inserted region among wavelet coefficients of a first region of the video content,
wherein the second apparatus determines whether the video content is played by extracting a watermark value using an LSB of a quantized DCT coefficient of the watermark-inserted region among DCT coefficients of the first region of the video content.

15. The first apparatus of claim 14, further comprising a user interface through which at least one of a first filtering option for determining whether the video content is played through the second apparatus on the basis of the first detection result of the first apparatus and a second filtering option for determining on or off of a display screen of the video content in the second apparatus according to a second detection result of the additional data in the second apparatus is selectable.

16. The first apparatus of claim 14, wherein the processor generates control information for causing the video content to be unable to be played through the second apparatus in response to abnormal detection of the additional data as the first detection result, and generates control information indicating rendering of the video content in the second apparatus in response to normal detection of the additional data as the first detection result.

17. A video content rendering method in a first apparatus interoperating with a display apparatus, comprising:

receiving video content through a wired or wireless network, the video content including additional data;

detecting the additional data included in the video content, the additional data including a watermark; and determining whether the video content is played in the second apparatus according to a first detection result of the additional data and instructing control information with respect to rendering of the video content to be provided to the second apparatus, wherein the detecting the additional data comprises extracting a watermark value using a least significant bit (LSB) of a quantized wavelet coefficient of a watermark-inserted region among wavelet coefficients of a first region of the video content, wherein the second apparatus determines whether the video content is played by extracting a watermark value using an LSB of a quantized DCT coefficient of the watermark-inserted region among DCT coefficients of the first region of the video content.

\* \* \* \* \*